United States Patent
Nishimoto et al.

(10) Patent No.: US 11,872,992 B2
(45) Date of Patent: Jan. 16, 2024

(54) VEHICLE USER-ASSISTANCE SYSTEM, VEHICLE USER-ASSISTANCE DEVICE, AND VEHICLE USER-ASSISTANCE SERVER

(71) Applicant: TOYOTA JIDOSHA KABUSHIKI KAISHA, Toyota (JP)

(72) Inventors: Takashi Nishimoto, Owariasahi (JP); Kenji Sato, Toyota (JP); Kei Yamamoto, Toyota (JP); Ryuta Yamasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/353,891

(22) Filed: Jun. 22, 2021

(65) Prior Publication Data
US 2022/0017097 A1 Jan. 20, 2022

(30) Foreign Application Priority Data
Jul. 17, 2020 (JP) ................................. 2020-123061

(51) Int. Cl.
| | |
|---|---|
| G08B 23/00 | (2006.01) |
| B60W 40/08 | (2012.01) |
| B60W 50/08 | (2020.01) |
| G06N 5/04 | (2023.01) |
| G06Q 40/08 | (2012.01) |
| G10L 17/26 | (2013.01) |

(52) U.S. Cl.
CPC .......... *B60W 40/08* (2013.01); *B60W 50/085* (2013.01); *G06N 5/04* (2013.01); *G06Q 40/08* (2013.01); *G10L 17/26* (2013.01); *B60W 2540/043* (2020.02); *B60W 2540/22* (2013.01)

(58) Field of Classification Search
CPC .............. B60W 40/08; B60W 50/085; B60W 2540/043; B60W 2540/22; B60W 50/08; B60W 2540/21; G06N 5/04; G06Q 40/08; G10L 17/26; G10L 25/63; G01C 21/3484
USPC .. 340/576, 575, 573.1, 425.5, 426.1, 426.14
See application file for complete search history.

(56) References Cited

U.S. PATENT DOCUMENTS

| | | | |
|---|---|---|---|
| 11,086,317 B2 * | 8/2021 | Healey | ................ A61B 5/0077 |
| 2008/0119994 A1 * | 5/2008 | Kameyama | ........... B60W 40/08 701/1 |
| 2010/0030434 A1 | 2/2010 | Okabe et al. | |
| 2016/0171521 A1 * | 6/2016 | Ramirez | ................ B60K 35/00 701/409 |
| 2016/0236690 A1 * | 8/2016 | Juneja | ................... B60W 50/14 |
| 2018/0281811 A1 | 10/2018 | Tochioka et al. | |

(Continued)

FOREIGN PATENT DOCUMENTS

| | | |
|---|---|---|
| CN | 108688676 A | 10/2018 |
| JP | 2002-056500 A | 2/2002 |

(Continued)

*Primary Examiner* — Anh V La
(74) *Attorney, Agent, or Firm* — Oliff PLC

(57) ABSTRACT

In a vehicle user-assistance system, a user's voice is acquired before the user enters a vehicle, and the mental state of the user is inferred based on the acquired voice. Then, it is determined whether the inferred mental state is an irritated state compared with a criterial value. When the mental state is an irritated state, navigation that relieves irritation is proposed to the user having entered the vehicle. Thus, the user starts to travel with his or her irritation reduced or relieved.

10 Claims, 8 Drawing Sheets

(56) References Cited

U.S. PATENT DOCUMENTS

| | | | |
|---|---|---|---|
| 2019/0318159 A1* | 10/2019 | Blanc-Paques | G06Q 50/30 |
| 2019/0376808 A1 | 12/2019 | Shikanai et al. | |
| 2020/0056902 A1* | 2/2020 | Woo | A61B 5/18 |
| 2021/0156700 A1* | 5/2021 | Davis | G06Q 10/02 |

FOREIGN PATENT DOCUMENTS

| | | |
|---|---|---|
| JP | 2002-245253 A | 8/2002 |
| JP | 2008-070966 A | 3/2008 |
| JP | 2008-123448 A | 5/2008 |
| JP | 2020-67847 A | 4/2020 |
| WO | 2018/123055 A1 | 7/2018 |

* cited by examiner

FIG. 3

| | DETERMINATION CRITERIA DATA | | APPLICABILITY |
|---|---|---|---|
| A | DETERMINATION CRITERION | IRRITATED STATE > CRITERIAL VALUE | |
| | ACTION ITEMS | A-1 | PROVIDING NAVIGATION<br>- PROPOSING ROUTE THAT RELIEVES IRRITATION AND REST AREA<br>- SETTING OUTDOOR REST AREA IN CASE OF FINE WEATHER AND INDOOR REST AREA IN CASE OF RAINY WEATHER | ○ |
| | | A-2 | ... | ○ |
| | | A-3 | ... | |
| B | DETERMINATION CRITERION | EXCITED STATE > CRITERIAL VALUE | |
| | ACTION ITEMS | ... | ○ |
| C | DETERMINATION CRITERION | DISTRACTED STATE > CRITERIAL VALUE | |
| | ACTION ITEMS | ... | ○ |
| D | DETERMINATION CRITERION | SLEEPY STATE > CRITERIAL VALUE | |
| | ACTION ITEMS | ... | ○ |
| E | DETERMINATION CRITERION | RELAXED STATE > CRITERIAL VALUE | |
| | ACTION ITEMS | ... | ○ |
| F | DETERMINATION CRITERION | MERRY STATE > CRITERIAL VALUE | |
| | ACTION ITEMS | ... | |

FIG. 5

| DETERMINATION CRITERIA DATA | | | | APPLICABILITY |
|---|---|---|---|---|
| B | DETERMINATION CRITERION | EXCITED STATE > CRITERIAL VALUE | | |
| | ACTION ITEMS | B-1 | DIFFUSING SCENT FIRST | |
| | | | B-1-1 | DIFFUSING RELAXING SCENT AND THEN DIFFUSING AWAKENING SCENT | ○ |
| | | | B-1-2 | DIFFUSING RELAXING SCENT AND THEN OUTPUTTING AWAKENING VOICE | ○ |
| | | | B-1-3 | DIFFUSING RELAXING SCENT AND THEN TURNING ON AWAKENING ROOM LAMP | |
| | | B-2 | OUTPUTTING VOICE FIRST | |
| | | | B-2-1 | OUTPUTTING RELAXING VOICE AND THEN OUTPUTTING AWAKENING VOICE | |
| | | | B-2-2 | OUTPUTTING RELAXING VOICE AND THEN DIFFUSING AWAKENING SCENT | |
| | | | B-2-3 | OUTPUTTING RELAXING VOICE AND THEN TURNING ON AWAKENING ROOM LAMP | |
| | | B-3 | TURNING ON ROOM LAMP FIRST | |
| | | | B-3-1 | TURNING ON RELAXING ROOM LAMP AND THEN TURNING ON AWAKENING ROOM LAMP | |
| | | | B-3-2 | TURNING ON RELAXING ROOM LAMP AND THEN DIFFUSING AWAKENING SCENT | |
| | | | B-3-3 | TURNING ON RELAXING ROOM LAMP AND THEN OUTPUTTING AWAKENING VOICE | |

FIG. 7

| BASIC DATA FOR CALCULATING INSURANCE PREMIUMS | | | |
|---|---|---|---|
| USER NAME | XXXXXX | | |
| | DATE AND TIME | MENTAL STATE IMMEDIATELY BEFORE STARTING TO DRIVE | MENTAL STATE DURING DRIVING |
| | ... | ... | ... |
| | 4/26/2020 14:20 | GOOD | GOOD |
| | 4/26/2020 16:38 | EXCITED STATE | GOOD |
| | ... | ... | ... |
| USER NAME | YYYYYY | | |
| | DATE AND TIME | MENTAL STATE IMMEDIATELY BEFORE STARTING TO DRIVE | MENTAL STATE DURING DRIVING |
| | ... | ... | ... |

VEHICLE USER-ASSISTANCE SYSTEM, VEHICLE USER-ASSISTANCE DEVICE, AND VEHICLE USER-ASSISTANCE SERVER

CROSS-REFERENCE TO RELATED APPLICATION

This application claims priority to Japanese Patent Application No. 2020-123061 filed on Jul. 17, 2020, incorporated herein by reference in its entirety.

BACKGROUND

1. Technical Field

The present disclosure relates to a vehicle user-assistance system, a vehicle user-assistance device, and a vehicle user-assistance server that assist a user who enters a vehicle.

2. Description of Related Art

In the field of vehicles, a technology that involves acquiring information on the mental state of a driver and providing information to the driver or performing operation control is known.

According to Japanese Unexamined Patent Application Publication No. 2008-070966, a driver's voice is acquired, for example, while the driver makes a hands-free call on a mobile phone, and the mental state (feelings) of the driver is inferred from the voice. In the vehicle, for example, a message, music, or a scent that promotes relaxation is produced according to the inferred mental state.

According to Japanese Unexamined Patent Application Publication No. 2002-056500, the state of a driver is determined based on biological information, such as brain waves, of the driver.

According to Japanese Unexamined Patent Application Publication No. 2002-245253, the mental state of a driver who drives a vehicle is inferred and insurance premiums on the vehicle are set based on the result of the inference.

SUMMARY

It is desirable that vehicles be safely driven from the start of travel. If the mental state of a user at the start of travel can be inferred, it would expand the possibility of user assistance.

However, as the user needs to move his or her body before and after entering the vehicle, the user's posture, viewpoint, heart rate, etc. fluctuate. This makes it difficult to infer the mental state of the user from information on the user's posture, viewpoint, heart rate, etc. Further, users of vehicles do not always talk after entering their vehicles. Thus, it is not always possible to infer the mental state of a user by acquiring the voice of the user having entered the vehicle.

An object of the present disclosure is to promptly start to assist a user having entered a vehicle based on the mental state of the user.

A vehicle user-assistance system according to the present disclosure includes: an inference unit that infers the mental state of a user based on the user's voice acquired before the user enters a vehicle; and an assistance unit that performs a process of assisting the user having entered the vehicle based on information on the inferred mental state of the user.

In one aspect of the present disclosure, the user's voice may be acquired through a mobile terminal carried by the user.

In one aspect of the present disclosure, the vehicle user-assistance system may further include a data acquisition unit that acquires data about a schedule of the user, and the assistance unit may perform a process of assisting the user based on the mental state and the data.

In one aspect of the present disclosure, the vehicle user-assistance system may further include a data acquisition unit that acquires data about an environment surrounding the user, and the assistance unit may perform a process of assisting the user based on the mental state and the data.

In one aspect of the present disclosure, the assistance unit may perform a process of navigating the vehicle based on the mental state and the data.

In one aspect of the present disclosure, the mental state may be a mental state that constitutes a factor negatively affecting driving when the user drives the vehicle, and the assistance unit may perform a process of facilitating a change in the mental state of the user.

In one aspect of the present disclosure, the assistance unit may perform a process of facilitating a change in the mental state by producing a scent, light, or a voice according to the mental state to the user.

In one aspect of the present disclosure, when the inferred mental state is a state of a high level of excitement, the assistance unit may perform a process of producing a scent, light, or a voice that promotes relaxation and then producing a scent, light, or a voice that promotes awakening.

In one aspect of the present disclosure, based on the mental state, the assistance unit may perform a process of generating basic data for calculating an insurance premium on driving insurance of the user.

In one aspect of the present disclosure, based on a new mental state of the user who has undergone a change in the mental state, the assistance unit may further perform a process of generating basic data for calculating an insurance premium on driving insurance of the user.

A vehicle user-assistance device according to the present disclosure includes an assistance unit that performs a process of assisting a user having entered a vehicle based on information on the mental state of the user that is inferred from the user's voice acquired before the user enters the vehicle.

A vehicle user-assistance server according to the present disclosure includes an acquisition unit that acquires a user's voice before the user enters a vehicle; an inference unit that infers the mental state of the user before the user enters the vehicle based on the acquired voice; and a transmission unit that transmits information on the inferred mental state of the user to a device that assists the user having entered the vehicle.

By analyzing the mental state of a user based on the user's voice acquired before the user enters the vehicle, the present disclosure can promptly assist the user having entered the vehicle based on the mental state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing an example of determination criteria data;

FIG. 5 is a table showing an example of the determination criteria data;

FIG. 7 is a table showing an example of basic data for calculating insurance premiums.

DETAILED DESCRIPTION OF EMBODIMENTS

An embodiment will be described below with reference to the drawings. While specific aspects will be shown in the description to help understand the present disclosure, these aspects are illustrative of the embodiment and various other embodiments can be adopted.

(1) Device Configuration of Vehicle User-Assistance System

Figure 1:
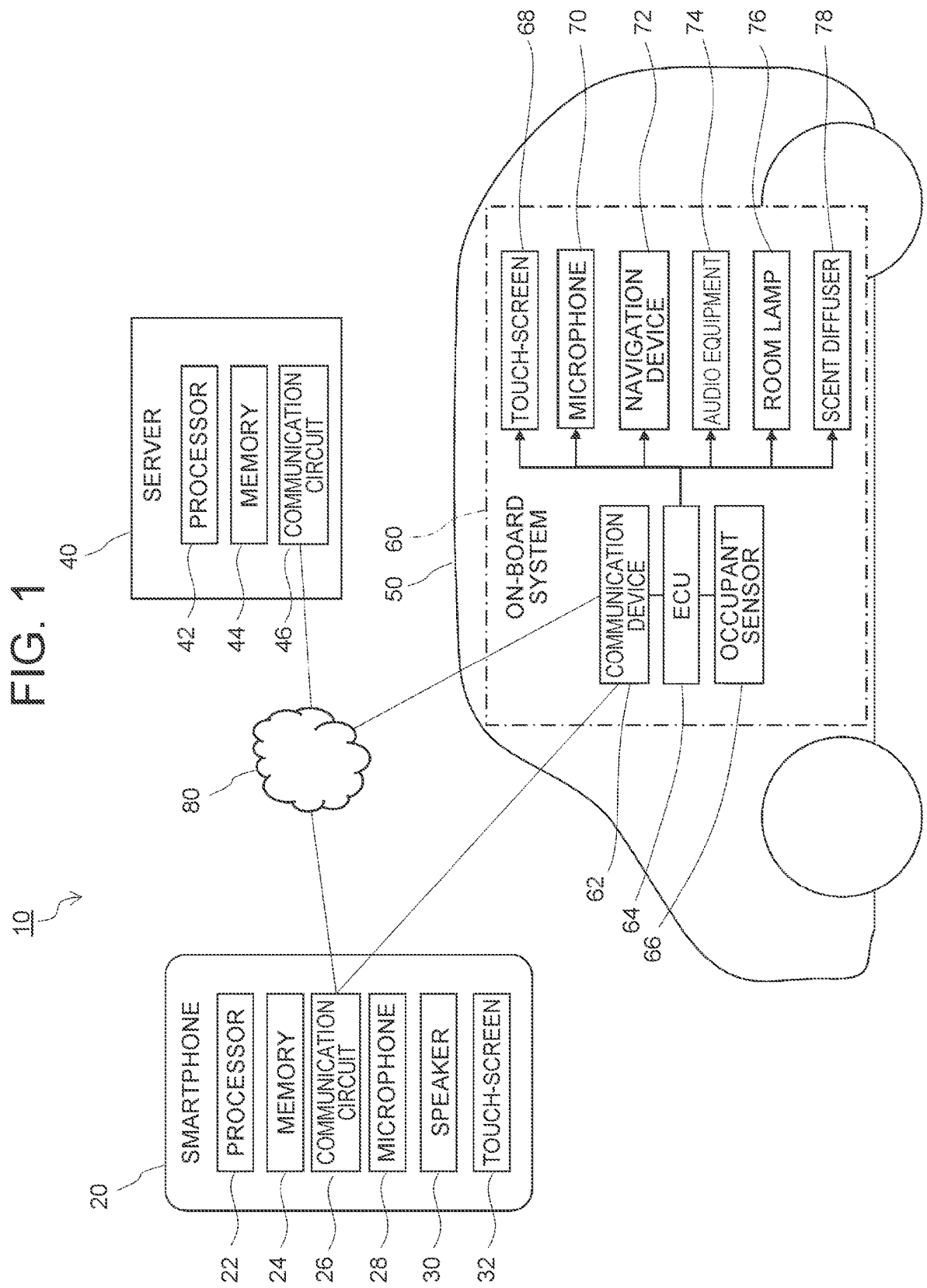
FIG. 1 is a diagram showing the device configuration of a vehicle user-assistance system according to an embodiment.

FIG. 1 is a block diagram showing an example of the hardware configuration of a vehicle user-assistance system 10 according to the embodiment. The vehicle user-assistance system 10 includes a smartphone 20, a server 40, and an on-board system 60 that is installed in a vehicle 50. FIG. 1 also shows a communication network 80 that is the Internet or the like.

The smartphone 20 is a mobile terminal used by a user who enters the vehicle 50. (The user may be either a driver or an occupant other than the driver.) The smartphone 20 includes a processor 22, a memory 24, a communication circuit 26, a microphone 28, a speaker 30, and a touch-screen 32.

The processor 22 is a device having a calculation function, such as a central processing unit or a graphical processing unit. While the smartphone 20 is sometimes provided with a plurality of processors 22, in FIG. 1, only one processor 22 is symbolically shown.

The memory 24 is a storage device that is formed using a semiconductor or the like. While the smartphone 20 is sometimes provided with a plurality of memories 24, in FIG. 1, only one memory 24 is symbolically shown. In the memory 24, software including an operating system (OS) and application programs (applications) are stored. The smartphone 20 operates as the processor 22, the memory 24, and other components are controlled in accordance with this software.

The communication circuit 26 is provided to perform wireless communication or wired communication with external devices. The communication circuit 26 connects to and communicates with the server 40, the on-board system 60, and other smartphones (not shown) via the communication network 80. The communication circuit 26 can also directly communicate with the on-board system 60, for example, by short-range wireless communication or cable connection.

The microphone 28 is a device that converts a voice emitted by a user etc. into electrical signals. The microphone 28 is used, for example, when the user makes a call using a telephone function of the smartphone 20 or talks to artificial intelligence (AI) in the smartphone 20.

The speaker 30 is a device that converts electrical signals into sounds. The speaker 30 is used to output the voice of a person at the other end of the line in the telephone function, the voice of the AI talking to the user, music, etc.

The touch-screen 32 is a display having an input function. The touch-screen 32 is used as a graphical user interface of the smartphone 20. The touch-screen 32 also displays images according to an application.

The server 40 is a device that is built, for example, using a computer, such as a personal computer (PC), and connected to the communication network 80. As with the smartphone, the server 40 includes a processor 42, a memory 44, a communication circuit 46, etc. As with the smartphone 20, the operation of the server 40 is controlled by an OS, an application, etc.

The vehicle 50 is a road vehicle that a user enters to travel. The vehicle 50 includes a prime mover, such as an engine or a motor, and wheels that are driven to rotate by the prime mover, and can travel autonomously. Typically, the vehicle 50 travels as the user who is the driver performs driving operation. However, the vehicle 50 may, for example, have an automatic driving mode and be automatically driven under control of a device installed in the vehicle 50 or a device installed in the server 40.

The on-board system 60 consists of devices installed in the vehicle 50. The on-board system 60 includes a communication device 62, an ECU 64, an occupant sensor 66, a touch-screen 68, a microphone 70, a navigation device 72, audio equipment 74, a room lamp 76, and a scent diffuser 78.

The communication device 62 is a device that connects wirelessly to the communication network 80 to communicate with the smartphone 20, the server 40, etc. The communication device 62 can also directly connect to the smartphone 20.

The ECU 64 is short for an electric control unit and means a computer installed in the vehicle 50. The ECU 64 includes a processor, a memory, etc., and is controlled by an OS, an application, etc. The vehicle 50 is sometimes provided with a plurality of ECUs 64. The ECU 64 performs, other than control to be described in this embodiment, driving control of the vehicle such as control of acceleration, deceleration, and steering.

The occupant sensor 66 is an example of the detection unit, and is a sensor that detects that a user has entered the vehicle 50. The occupant sensor 66 can be formed by, for example, an infrared ray sensor that detects the presence of a person near a seat, or a load sensor provided in a seat. Alternatively, the user's entry into the vehicle may be detected by detecting the position of the smartphone 20 of the user etc. When the user is the driver, the user's entry into the vehicle may be detected by an operation (e.g., an operation of turning on the ignition switch or the power switch) performed on the vehicle 50 by the user.

The touch-screen 68 is, for example, a display having an input function and provided on an instrument panel. On the touch-screen 68, buttons for operating various devices of the vehicle 50 are displayed to allow operation of these devices, as well as maps of the navigation device 72 etc. are displayed.

The microphone 70 is a device that captures the voice of a user having entered the vehicle 50 and converts the voice into electrical signals. The microphone 70 sometimes also has a function of converting a voice into digital signals.

The audio equipment 74 includes a speaker and outputs voices. Those voices include various sounds and voices such as human voices, animal sounds, music (which need not include a human voice), and AI's voice imitating a human voice. The audio equipment 74 can output a voice that relaxes the user, a voice that awakens the user, etc. Examples of relaxing voices include a relatively low-volume voice, a relatively slow-talking voice, relatively slow-rhythm music, and ambient music. Examples of awakening voices include a relatively high-volume voice, a relatively quick-talking voice, and relatively quick-rhythm music. A voice talking to the user is also considered to awaken the user.

The room lamp 76 is provided, for example, in the ceiling, a pillar, the instrument panel, a door, or a floor of the vehicle 50. The room lamp 76 directly or indirectly illuminates the cabin of the vehicle 50 to visually stimulate the user. The room lamp 76 can perform illumination that relaxes the user, illumination that awakens the user, etc. While illumination can be implemented in various forms, for example, indirect illumination, relatively dark light, and warm-colored light (e.g., orange light having a long wavelength) are considered to be highly effective in relaxing the user. To relax the user, it is considered better that the light does not flash or flashes less. On the other hand, for example, direct illumination, relatively bright illumination, and cold-colored light (e.g., white light or blue light that has a short wavelength), and illumination in which the light flashes are considered to tend to awaken the user.

The scent diffuser 78 is a device that diffuses a fine substance that stimulates the olfactory sense into the cabin of the vehicle 50. The scent diffuser 78 diffuses a scent, for example, by holding the fine substance in the form of a perfume and sprays the perfume into the cabin. The flow of the fine substance and the extent of diffusion thereof can be controlled by adjusting the position of a sprayer or using an airflow created by an air conditioner. The scent diffuser 78 can diffuse a scent that relaxes the user, a scent that awakens the user, etc.

The configuration having been described above is one example, and the vehicle user-assistance system 10 can also have other hardware configuration. For example, the hardware can also be configured using only the smartphone 20 and the on-board system 60, without using the server 40. Further, the scent diffuser 78 and others may be controlled by the smartphone 20 or the server 40, without using the ECU 64 of the on-board system 60.

(2) Functional Configuration of Vehicle User-Assistance System

Figure 2:
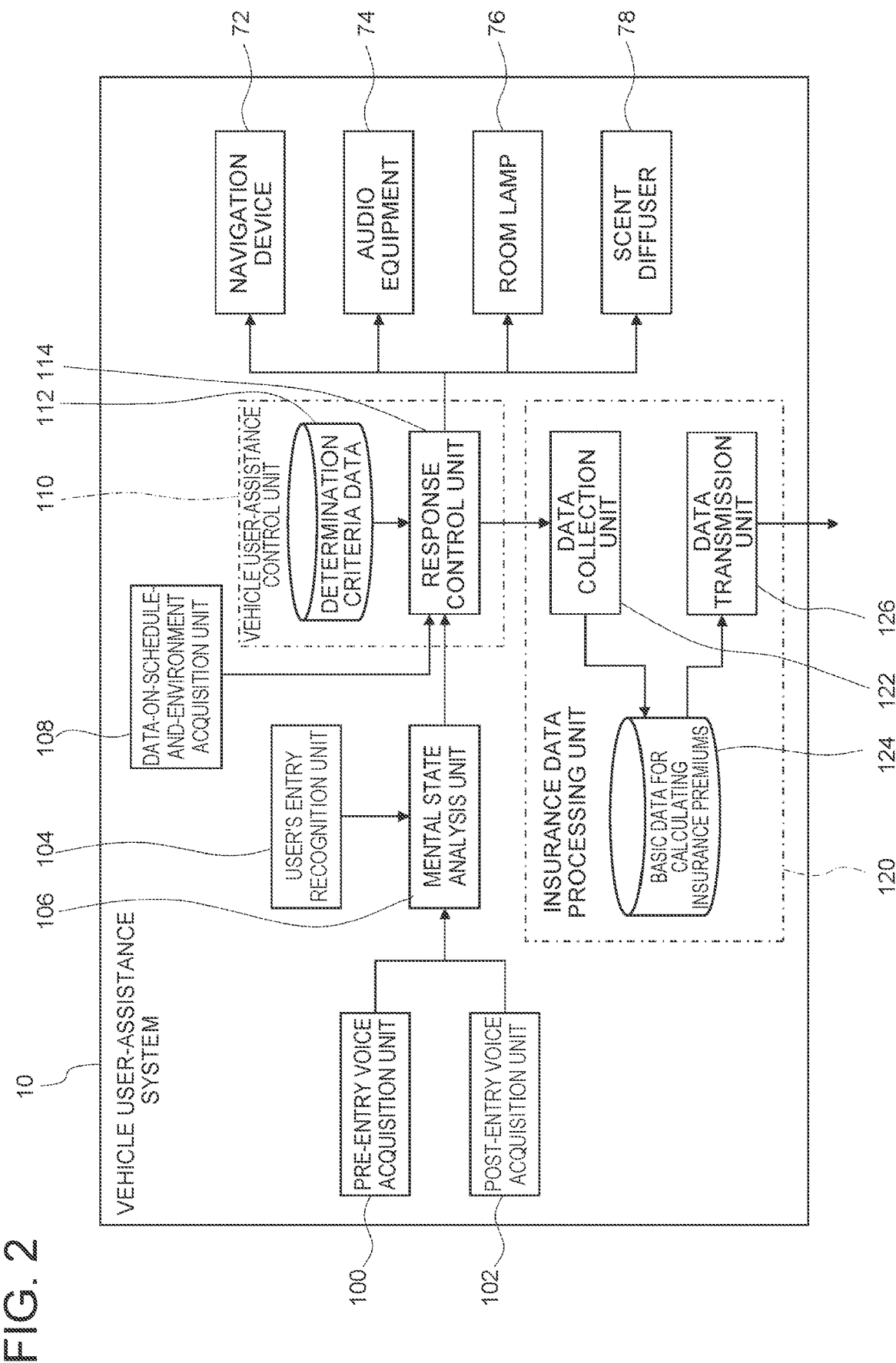
FIG. 2 is a block diagram showing the functional configuration of the vehicle user-assistance system.

FIG. 2 is a block diagram showing the functional configuration of the vehicle user-assistance system 10. The vehicle user-assistance system 10 includes a pre-entry voice acquisition unit 100, a post-entry voice acquisition unit 102, a user's entry recognition unit 104, a mental state analysis unit 106, a data-on-schedule-and-environment acquisition unit 108, a vehicle user-assistance control unit 110, and an insurance data processing unit 120. These units are formed as the hardware shown in FIG. 1 is controlled by the software. The vehicle user-assistance system 10 further includes the navigation device 72, the audio equipment 74, the room lamp 76, and the scent diffuser 78 shown in FIG. 1.

The pre-entry voice acquisition unit 100 is formed using the microphone 28 of the smartphone 20. The user makes a voice call on the smartphone 20 or talks to the AI in the smartphone 20. The pre-entry voice acquisition unit 100 converts an input voice into electrical signals and then digitizes the electrical signals to store the voice as voice data. The voice data may be stored in the smartphone 20, or may be stored in the server 40 or the on-board system 60. The pre-entry voice acquisition unit 100 updates the voice data with a new one as necessary. The pre-entry voice acquisition unit 100 always retains the latest voice data with a duration of, for example, about ten minutes or about five minutes.

The post-entry voice acquisition unit 102 digitizes a voice emitted by the user after the user enters the vehicle 50 to acquire voice data. The post-entry voice acquisition unit 102 may be formed using the microphone of the smartphone 20 or using the microphone 70 of the vehicle 50. When the smartphone 20 is used, there is no particular distinction between the pre-entry voice acquisition unit 100 and the post-entry voice acquisition unit 102 in terms of hardware.

The user's entry recognition unit 104 is formed using the occupant sensor 66 and detects that the user has entered the vehicle 50. The pre-entry voice acquisition unit 100 acquires a voice before the user enters the vehicle, while the post-entry voice acquisition unit 102 acquires a voice after the user enters the vehicle. In the process of entering the vehicle 50, the user performs the actions of opening the door, sitting on the seat, and closing the door. It is therefore difficult to strictly define the temporal boundary between before and after entry into the vehicle. It is assumed, however, that "before entry into the vehicle" includes at least a time before the user opens the door, and that "after entry into the vehicle" includes at least a time after the user closes the door. The voice data acquired after entry into the vehicle can be divided into voice data before starting to travel and voice data after starting to travel based on information from a speedometer etc. of the vehicle 50.

The mental state analysis unit 106 is an example of the inference unit, and analyzes the mental state of the user based on the voice data acquired by the pre-entry voice acquisition unit 100 and outputs data on the mental state. Various techniques can be used to analyze the mental state based on the voice. One example is a learning algorithm, such as deep learning. The mental state refers to the psychological tendency of the user at that time. Examples of mental states include a delighted state, a sad state, an angry state, an irritated state, and a surprised state. The term "mental state" is interchangeable with a "psychological state" or "feelings."

The mental state analysis unit 106 can analyze, for example, the tendency of the mental state of the user departing from the state of the user at normal times and the degree of this departure. Specifically, the mental state analysis unit 106 can analyze how the mental state at the time of acquisition of the voice data departs from the mental state at normal times. (This departed mental state will be referred to as "a mental state different from that at normal times.") Further, the mental state analysis unit 106 can analyze the tendency of the mental state of the user departing from an average state of many people and the degree of this departure. Specifically, the mental state analysis unit 106 can analyze how the mental state at the time of acquisition of the voice data departs from the average mental state of common people. (This departed mental state will be referred to as "a mental state different from that of common people.") The vehicle user-assistance system 10 can handle one or both of the mental state different from that at normal times and the mental state different from that of common people. Of course, the vehicle user-assistance system 10 can also handle various other mental states than those states.

The mental state more or less affects driving of a vehicle. In particular, a mental state that can hinder the user from driving the vehicle safely will be referred to as a mental state that constitutes a factor negatively affecting driving. Examples of mental states that constitute factors negatively affecting driving include an excited state, irritated state, distracted state, and sleepy state. An excited state refers to a state in which the user is excited and unable to make a calm judgement. An irritated state refers to a mental state in which the user is irritated at himself or herself or others and has an aggressive feeling. A distracted state refers to a state in which the user is unable to concentrate for some reason. A sleepy state refers to a state in which the user is feeling sleepy. These states are not necessarily independent of one another, and the mental state of the user may appear as a combination of some of these states.

The mental state analysis unit 106 can be built using the smartphone 20 or using the ECU 64 of the vehicle 50. Further, the mental state analysis unit 106 may be built using the server 40. Of course, the mental state analysis unit 106 may also be built in a form in which two or more devices among the smartphone 20, the ECU 64, and the server 40 cooperate with each other.

The data-on-schedule-and-environment acquisition unit 108 is one example of the data acquisition unit and acquires data on the user's schedule or data about the environment surrounding the user. The data on the user's schedule can be acquired, for example, from the smartphone 20. Alternatively, the schedule data may be acquired, for example, through the smartphone 20 from a cloud server that is connected to the communication network 80. At the same time, the data-on-schedule-and-environment acquisition unit 108 acquires data on the calendar or the time, such as the date and time or the day.

The data about the environment surrounding the user refers to information on the weather, the atmospheric temperature, the position, etc. Information on the weather, the atmospheric temperature, etc. can be acquired by accessing a weather information site through the communication network 80. Alternatively, information on the weather and the atmospheric temperature may be acquired from sensors provided in the vehicle 50. Information on the position can be acquired, for example, from Global Navigation Satellite System (GNSS) provided in the vehicle 50 or the smartphone 20.

The vehicle user-assistance control unit 110 is an example of the assistance unit and performs a control process of exerting influence on the user inside the vehicle 50 based on the mental state analyzed by the mental state analysis unit 106. The vehicle user-assistance control unit 110 is provided with a determination criteria data 112 and a response control unit 114. The determination criteria data 112 is data in which items to be implemented according to the mental state are set. A specific example of the determination criteria data 112 will be described later.

Based on the determination criteria data 112, the response control unit 114 performs execution control of a process according to the mental state. In the example shown in FIG. 1, the response control unit 114 can order the insurance data processing unit 120 to execute a process relating to insurance data. Further, the response control unit 114 can order the navigation device 72, the audio equipment 74, the room lamp 76, and the scent diffuser 78 to execute processes.

The vehicle user-assistance control unit 110 may be built using only the smartphone 20, using only the server 40, or using only the ECU 64 of the vehicle 50. Alternatively, the vehicle user-assistance control unit 110 may be built by the smartphone 20 and the server 40 cooperating with each other, or by the smartphone 20 and the ECU 64 cooperating with each other, or by the server 40 and the ECU 64 cooperating with each other. Further, the vehicle user-assistance control unit 110 may be built by the smartphone 20, the ECU 64, and the server 40 cooperating with one another.

The insurance data processing unit 120 is an example of the assistance unit and performs a process of generating basic data for calculating insurance premiums using information on the analyzed mental state. The insurance data processing unit 120 is provided with a data collection unit 122, basic data for calculating insurance premiums 124, and a data transmission unit 126.

In response to an order from the response control unit 114, the data collection unit 122 collects data on the mental state and stores the data as the basic data for calculating insurance premiums 124.

The basic data for calculating insurance premiums 124 is data used to calculate insurance premiums on vehicle driving insurance that the user takes out. It is generally considered that when the mental state of the user driving the vehicle 50 does not include a factor that negatively affects driving, and further, when the mental state is good, the probability of an accident caused by the vehicle 50 is lower. Therefore, the basic data for calculating insurance premiums 124 is built based on data obtained by analyzing the mental state.

As the data on the mental state used as the basic data for calculating insurance premiums 124, the voice data acquired by the pre-entry voice acquisition unit 100 can be used. The basic data for calculating insurance premiums 124 in this case is used when calculating insurance premiums based on whether the mental state of the user before the user enters the vehicle 50 includes a factor that negatively affects driving.

As the data on the mental state used as the basic data for calculating insurance premiums 124, the voice data acquired by the post-entry voice acquisition unit 102 can also be used. The basic data for calculating insurance premiums 124 in this case is used when calculating insurance premiums based on whether the mental state of the user at a stage after entering the vehicle 50 includes a factor that negatively affects driving. Therefore, the effect of improving the mental state of the user by the response control unit 114 using the navigation device 72, the audio equipment 74, the room lamp 76, or the scent diffuser 78 is reflected in the basic data for calculating insurance premiums 124.

The data transmission unit 126 transmits the basic data for calculating insurance premiums 124 to the server 40. The data may be transmitted on a regular basis, or may be transmitted, for example, upon receiving an order from the server 40.

The insurance data processing unit 120 can be built as an application in the smartphone 20, or may be built in the ECU 64 of the vehicle 50. Alternatively, the insurance data processing unit 120 may be built in the server 40. Of course, the insurance data processing unit 120 may also be built in a form in which two or more devices among the smartphone 20, the ECU 64, and the server 40 cooperate with each other. The insurance data processing unit 120 may further have a function of calculating insurance premiums in accordance with an insurance premium calculation algorithm.

The navigation device 72, the audio equipment 74, the room lamp 76, and the scent diffuser 78 are examples of the assistance unit and have the functions described above with reference to FIG. 1. These devices are controlled by the response control unit 114 and used to improve the mental state of the user. Instead of the navigation device 72, the audio equipment 74, or the room lamp 76, a navigation function, an audio function, or a light function of the smartphone 20 can also be used. Other than the navigation device 72, the audio equipment 74, the room lamp 76, and the scent diffuser 78, devices that improve the mental state of the user may be introduced. One example is a device that improves the mental state of the user by vibrating a seat of the vehicle 50.

(3) Proposal of Navigation that Improves Mental State

Figure 4:
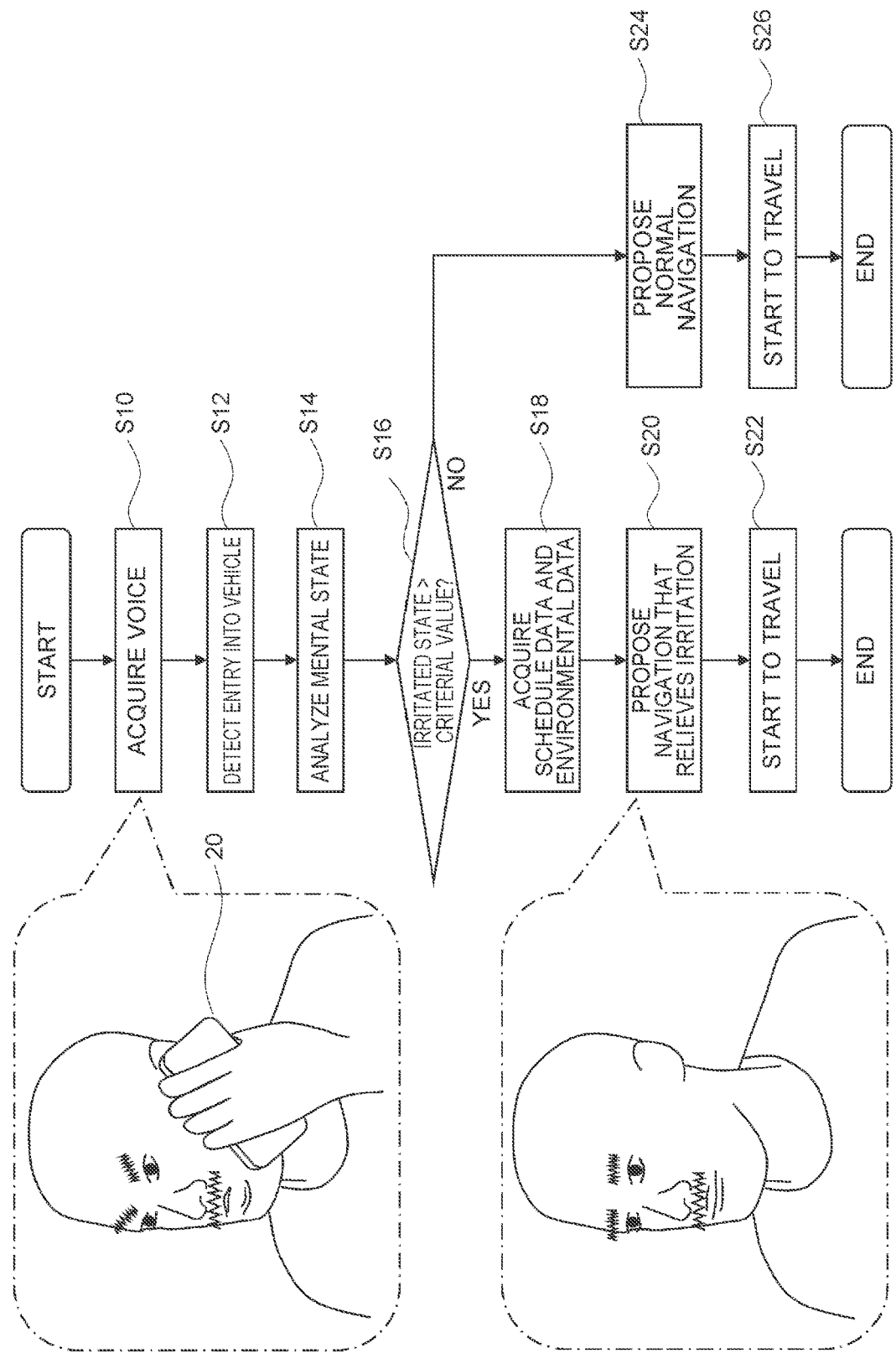
FIG. 4 is a flowchart showing an example in which navigation is provided.

An aspect in which the vehicle user-assistance system 10 provides navigation will be described with reference to FIG. 3 and FIG. 4. FIG. 3 is one example of the determination criteria data 112 shown in FIG. 2, and FIG. 4 is a flowchart showing an example of the operation of the vehicle user-assistance system 10.

The determination criteria data shown in FIG. 3 is classified into items A to F, for each of which "determination criterion" and "action items" are set in the form of a table. At the right side of the table, the "applicability" field is provided. Only those determination criteria and action items that are marked with a circle in the "applicability" field are actually applied. In the example of FIG. 3, items A to F are all marked with a circle in the "applicability" field and therefore applied. As items A to F, an irritated state, excited state, distracted state, sleepy state, relaxed state, and merry state are respectively set.

In the "determination criterion" field of item A, "irritated state>criterial value" is set. It is assumed here that the mental state is represented by a numerical value corresponding to one of multiple levels and compared with the criterial value that is also represented by a numerical value. When the irritated state is greater than the criterial value, the contents set in the "action items" field are applied.

In the "action items" field of item A, three action items A-1, A-2, and A-3 are described. Of these, only A-1 is marked with a circle in the "applicability" field and thus set as an action item to be actually applied.

A-1 is set for providing navigation. Specifically, listed in A-1 are: proposing a route that relieves irritation and a rest area; and setting an outdoor rest area in the case of fine weather and an indoor rest area in the case of rainy weather. Whether the weather is fine or rainy is determined based on information from the data-on-schedule-and-environment acquisition unit shown in FIG. 2.

The flowchart of FIG. 4 shows the flow of the operation of the vehicle user-assistance system 10 in the case where this determination criteria data is used. In the example of FIG. 4, first, it is assumed that the user is making a call outside the vehicle, with the smartphone 20 in his hand. The user is irritated, and the irritated mental state is visible in his facial expression. In the vehicle user-assistance system 10, the pre-entry voice acquisition unit 100 that uses the microphone 28 of the smartphone 20 acquires the user's voice before the user enters the vehicle and stores the voice as voice data (S10).

Subsequently, the user enters the vehicle. It is assumed that the user enters the vehicle, for example, within ten minutes after the end of the call. It is also possible that the user may enter the vehicle within five minutes, three minutes, or one minute after the end of the call. It is also assumed that the user enters the vehicle while making a call. In any case, the user's entry recognition unit 104 detects the user's entry into the vehicle 50 (S12). Then, the mental state analysis unit 106 analyzes the mental state based on the stored voice data, at least the voice data including the voice during the time before the user enters the vehicle (S14). The analysis accuracy of the mental state analysis may be increased by additionally acquiring a moving image or a still image taken of the user or biological information, such as the heart rate, of the user.

Subsequently, the response control unit 114 makes determination with reference to the determination criteria data illustrated in FIG. 3 (S16). In the example shown in FIG. 4, only the determination as to whether the user is irritated based on "irritated state>criterial value" of item A in the determination criteria data of FIG. 3 is shown. In the actual determination, more than one item among items A to F may apply. In this case, for example, more than one action item that is applicable may be executed, or only the action items of the most prominent mental state may be applied.

When the user is irritated, "providing navigation" of A-1 in the determination criteria data of FIG. 3 is executed. Therefore, the data-on-schedule-and-environment acquisition unit 108 acquires data on the user's schedule and environmental data (S18).

The response control unit 114 orders the navigation device 72 to propose a route that relieves irritation or a rest area within such a range that no conflict with the user's schedule arises. The navigation device 72 presents a route that meets the conditions to the user (S20). Examples of routes that relieve irritation, when more than one route is conceivable, include a route with a beautiful scenery, a route with light traffic of vehicles and pedestrians, a route with a small number of stops due to traffic signals etc., a route that the user is presumed to have hardly ever traveled from the user's driving history, and a route on which there is an easily accessible rest area.

When the distance is so long that a rest is needed, an outdoor area is proposed as the rest area in the case of fine weather, and a route stopping by an indoor area is set in the case of rainy weather. Examples of outdoor areas include a rest area with a beautiful scenery, a rest area with many trees etc., a shop that is presumed to be the user's favorite from a past history, and a similar shop. Examples of indoor areas include a rest area in which one can move from the parking lot to a facility, such as a restroom, without getting wet, and a rest area where the parking lot is large and one can easily get in and out of the vehicle.

The navigation device 72 communicates the selected route and rest area to the user through a display or a voice, for example, at a stage before the vehicle 50 starts to travel. Then, the user starts to travel (S22). At the start of travel, the user's irritation is reduced as he listens to the proposal of the navigation device 72. The user's irritation is further reduced as he actually travels the proposed route. Instead of communicating the selected route and rest area to the user at a stage before the vehicle 50 starts to travel, the navigation device 72 may communicate them to the user after the vehicle 50 starts to travel. Also in this case, the user's irritation is reduced at the stage when the options are communicated to him, or by actually traveling the route communicated to him. In the example of FIG. 4, at the stage of step S22, the user's facial expression has softened, suggesting that his irritation has been reduced or relieved.

On the other hand, when it is determined in step S16 that the user is not irritated, normal navigation is proposed (S24), and the vehicle starts to travel (S26).

In the above description, the mental state of the user is improved by proposing a route or a rest area as navigation. Other techniques of improving the mental state using navigation are also possible. One example is an aspect in which the mental state is improved by changing the voice in which navigation is provided. Examples of voices to be changed include a voice imitating the voice of a person providing navigation, and sound effects used in navigation. One example of changing the voice to improve an irritated state is an aspect in which the voice is lowered (the frequency is lowered). Further, in connection with changing the voice in the navigation device 72, it is also possible to introduce an embodiment to be shown next that involves the audio equipment 74.

(4) Example of Using Scent, Sound, or Light to Improve Mental State

Figure 6:
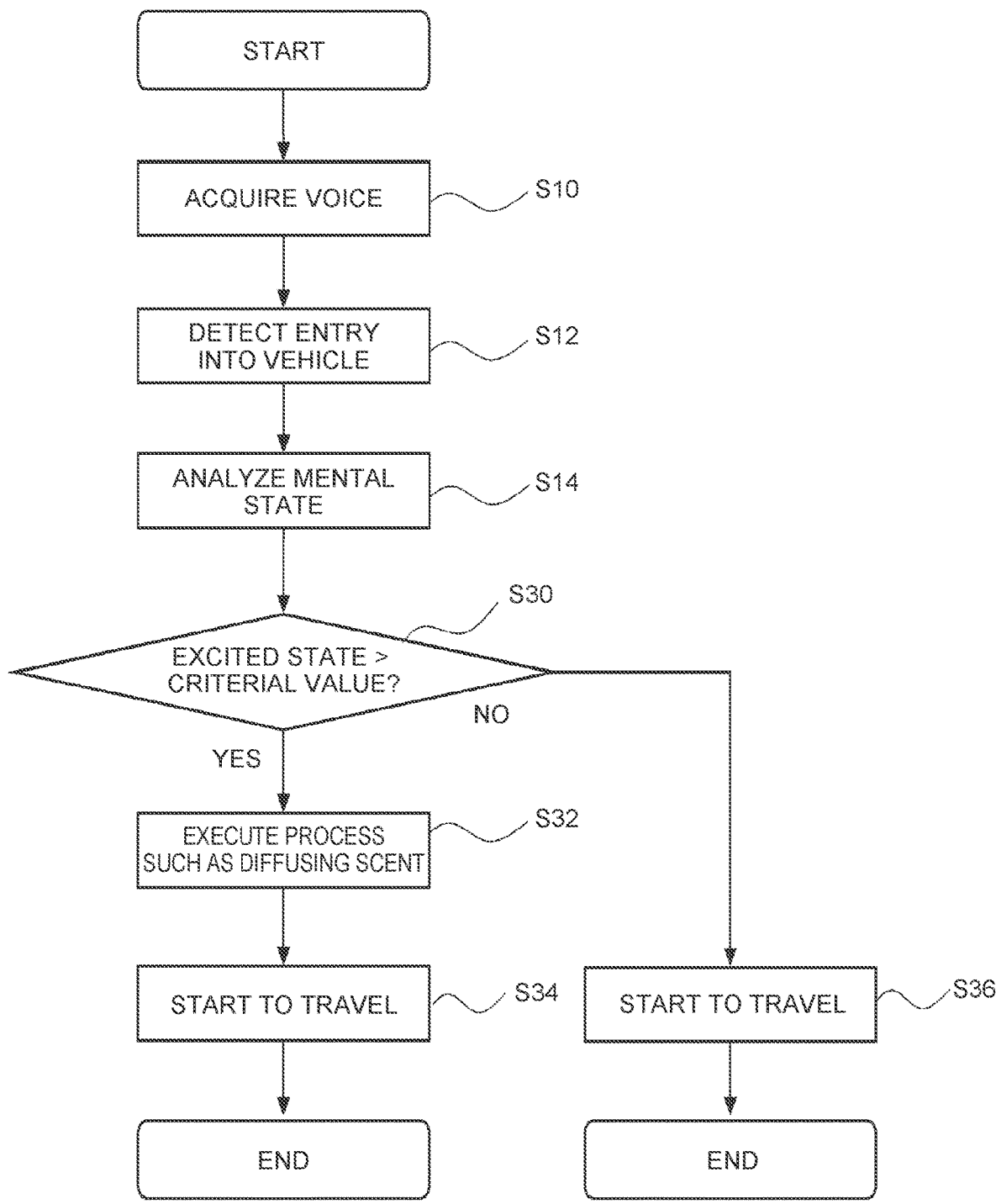
FIG. 6 is a flowchart showing an example in which a process such as diffusing a scent is executed.

An aspect in which the vehicle user-assistance system 10 executes a process such as diffusing a scent will be described with reference to FIG. 5 and FIG. 6. FIG. 5 is a table showing one example of the determination criteria data 112 shown in FIG. 2. FIG. 6 is a flowchart showing an example of the operation of the vehicle user-assistance system 10.

The determination criteria data shown in FIG. 5 shows details of item B shown in FIG. 3. For item B, "excited state>criterial value" is set as the determination criterion. The action items are divided into three of B-1, B-2, and B-3. B-1 is a setting of diffusing a scent first. B-2 is a setting of outputting a voice first. B-3 is a setting of turning on the room lamp first.

Item B-1 is further divided into three sub-items B-1-1, B-1-2, and B-1-3. B-1-1 is a setting of diffusing a relaxing scent and then diffusing an awakening scent. B-1-2 is a setting of diffusing a relaxing scent and then outputting an awakening voice. B-1-3 is a setting of diffusing a relaxing scent first and then turning on an awakening room lamp.

Similarly, B-2 and B-3 are also each divided into three sub-items. B-2-1 is a setting of outputting a relaxing voice and then outputting an awakening voice. B-2-2 is a setting of outputting a relaxing voice and then diffusing an awakening scent. B-2-3 is a setting of outputting a relaxing voice and then turning on an awakening room lamp. B-3-1 is a setting of turning on a relaxing room lamp and then turning on an awakening room lamp. B-3-2 is a setting of turning on a relaxing room lamp and then diffusing an awakening scent. B-3-3 is a setting of turning on a relaxing room lamp and then outputting an awakening voice.

In the example shown in FIG. 5, B-1-2 that is marked with a circle in the "applicability" field is set as the action item that is actually applied. It is also possible to apply more than one action item, for example, apply B-1-1 in addition to B-1-2, within such a range that no inconsistency arises.

The flowchart shown in FIG. 6 shows the flow of a process based on the determination criteria data of FIG. 5. In the process of FIG. 6, processing in steps S10, S12, and S14 are performed in the same manner as the processing in steps S10, S12, and S14 shown in FIG. 4. Subsequently, it is determined whether the excited state is greater than the criterial value (S30).

When the user is in an excited state with the level of excitement higher than the criterial value, a process such as diffusing a scent is executed (S32). Specifically, item B-1-2 set in the determination criteria data of FIG. 5 is applied. The response control unit 114 first orders the scent diffuser 78 to diffuse a relaxing type of scent. As a result, the user's excitement is reduced or calmed. It is also possible to take a longer time, for example, about one minute or about 30 seconds, to relax the user. A shorter time of about ten seconds or about five seconds can also be set. Alternatively, the relaxation process may be continued until the user performs a predetermined operation to start traveling, for example, until the user releases the parking brake of the vehicle 50 or shifts the shift lever from parking to drive etc.

Subsequently, the response control unit 114 orders the audio equipment 74 to output an awakening voice. The audio equipment awakens the user by outputting a relatively high-volume voice. Or the audio equipment awakens the user by quick-tempo music or a voice talking to the user. Thus, the user who has once relaxed can drive with enhanced concentration (S34).

To awaken the user, it is also effective to give the user an unpredictable stimulus. Therefore, a different voice may be output each time. Instead of the setting in which the action items shown in FIG. 5 are fixed, one sub-item or two or more sub-items included in B-1 to B-3 may be randomly selected and executed such that the user cannot predict.

On the other hand, when it is determined in step S30 that the user is not in an excited state, the response control unit 114 does not perform any process. The user is in a good mental state for driving and drives the vehicle 50 (S36).

(5) Example of Generating Basic Data for Calculating Insurance Premiums

Figure 8:
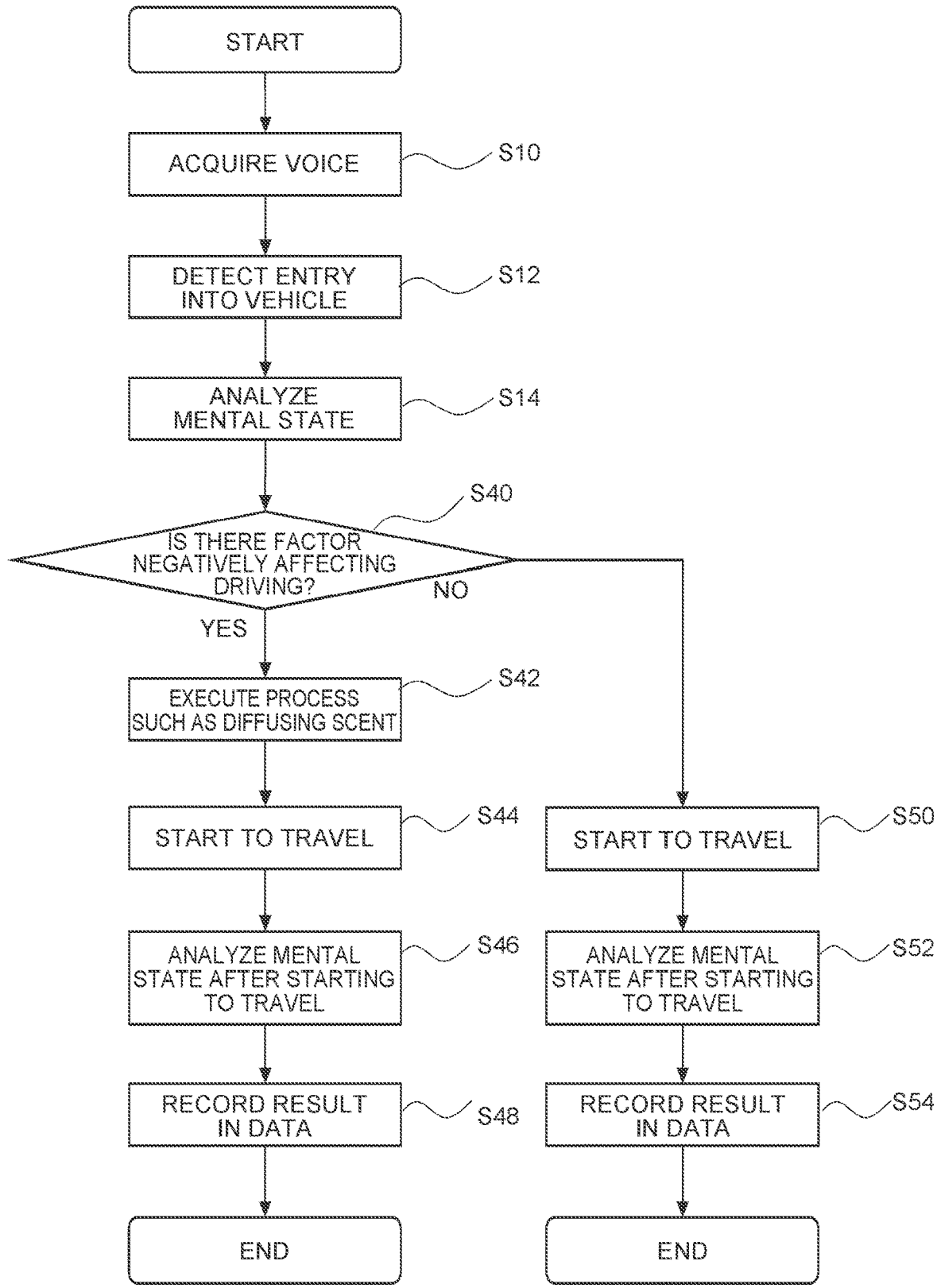
FIG. 8 is a flowchart showing an example in which the basic data for calculating insurance premiums is generated.

An aspect in which the vehicle user-assistance system 10 acquires basic data for calculating insurance premiums will be described with reference to FIG. 7 and FIG. 8. FIG. 7 is a table showing one example of the basic data for calculating insurance premiums shown in FIG. 2. FIG. 8 is a flowchart showing an example of the operation of the vehicle user-assistance system 10.

In the basic data for calculating insurance premiums shown in FIG. 7, the "user name" field is provided, and a record is kept for each user. In the example of FIG. 7, a record is kept for user names XXXXXX and YYYYYY. In the basic data for calculating insurance premiums for each user, the "date and time" field, the "mental state immediately before starting to drive" field, and the "mental state during driving" field are provided.

In the example of FIG. 7, it is recorded for the drive from 14:20 on Apr. 26, 2020 that the mental state before starting to drive was good and that the mental state during the drive was also good. Further, it is recorded for the drive from 16:38 on Apr. 26, 2020 that the mental state before starting to drive was an excited state but that the mental state during the drive was good.

Here, that the mental state is good means, for example, that the mental state does not include a factor that negatively affects driving. Mental states that do not include a factor that negatively affects driving may be recorded by being classified into multiple grades. One example is an aspect in which mental states are classified into three grades of 1, 2, and 3, of which 1 represents a mental state including a factor that negatively affects driving, 3 represents a mental state including a factor that positively affects driving, and 2 represents an intermediate mental state therebetween. A factor that positively affects driving is a factor in the opposite direction from a factor that negatively affects driving, and can be defined as, for example, a factor of a mental state that is suitable for driving while paying attention to vehicles, pedestrians, etc. around the user's vehicle. Specific examples include a mental state of a high degree of concentration, a mental state of a high degree of calmness, and a mental state of a high degree of wakefulness.

When a user has a record of many good mental states in the basic data for calculating insurance premiums shown in FIG. 7, that user is presumed to drive with a high degree of safety. Therefore, one idea is for an insurance company to obtain the basic data for calculating insurance premiums and make a discount on the insurance premiums of a user having a record of many good mental states. If a system of making a discount on the insurance premiums for being in a good mental state is introduced, it would create the motivation for the user to drive the vehicle 50 in a good mental state.

As shown in FIG. 7, in the vehicle 50 having introduced the vehicle user-assistance system 10, even when the mental state before entry into the vehicle includes a factor that negatively affects driving, this mental state is expected to be improved by a process such as diffusing a scent. As a result, the user drives in a good mental state at a higher rate, which is expected to increase the likelihood that the insurance premiums of the user will be discounted.

The flowchart of FIG. 8 shows a flow of a process in the case where the basic data for calculating insurance premiums is recorded. In FIG. 8, steps S10, S12, and S14 are the same as those in FIG. 4 and FIG. 6. Specifically, the user's voice before the user enters the vehicle is acquired (S10); the user's entry into the vehicle is detected (S12), and the mental state corresponding to the voice data acquired before the user's entry into the vehicle is analyzed (S14).

Subsequently, the response control unit 114 determines whether the mental state includes a factor that negatively affects driving (S40). For example, this determination is made in accordance with the determination criteria data 112 shown in FIG. 3. When there is a factor that negatively affects driving, a process such as diffusing a scent is performed (S42), and the vehicle starts to travel (S44). After the vehicle starts to travel, the mental state is analyzed, for example, based on voice data that is acquired by the post-entry voice acquisition unit 102 (S46). The result of the analysis is recorded by the data collection unit 122 as the basic data for calculating insurance premiums 124 (S48).

On the other hand, when there is no factor that negatively affects driving in step S40, the response control unit 114 does not perform any process. Also in this case, after the vehicle starts to travel (S50), the mental state is analyzed based on voice data acquired by the post-entry voice acquisition unit 102 (S52), and the result of the analysis is recorded as the basic data for calculating insurance premiums 124 (S54). The recorded basic data for calculating insurance premiums 124 is transmitted to the server 40 at an appropriate timing.

(6) Others

In the example shown above, the user of the vehicle 50 is mainly assumed to be the driver. However, the vehicle user-assistance system 10 is also applicable to a user who is an occupant other than the driver. It is expected that facilitating a change in the mental state of a user other than the driver toward a good mental state will increase the degree of satisfaction of that user himself or herself. Moreover, as the mental state of the user other than the driver is improved, the driving safety of the user who is the driver is expected to be enhanced. In addition, when the vehicle user-assistance system 10 is applied to a taxi, for example, improving the mental state of a user who is a passenger is expected to reduce or prevent the occurrence of trouble between the driver and the passenger.

The example shown above has been described with improving a mental state including a factor that negatively affects driving in mind. However, the vehicle user-assistance control unit 110 may also be used to maintain or control a mental state including a factor that positively affects driving. One example is an aspect in which a scent, a voice, or light having a concentration enhancing effect is diffused, output, or emitted to maintain a mental state in which the user is calm, as opposed to being irritated.

What is claimed is:

1. A vehicle user-assistance system comprising one or more processors configured to:
   acquire, before a user enters a vehicle, user voice through a mobile terminal carried by a user;
   infer, based on the acquired user voice, a mental state of the user that constitutes a factor negatively affecting driving when the user drives the vehicle; and
   perform a process of facilitating a change in the mental state as a process of assisting the user having entered the vehicle, based on mental state information on the mental state inferred based on the user voice that is acquired before the user enters the vehicle.

2. The vehicle user-assistance system according to claim 1, wherein the one or more processors are further configured to
   acquire data about a schedule of the user, and
   perform the process of assisting the user based on the mental state information and the data.

3. The vehicle user-assistance system according to claim 1, wherein the one or more processors are further configured to
   acquire data about an environment surrounding the user, and
   perform the process of assisting the user based on the mental state information and the data.

4. The vehicle user-assistance system according to claim 2, wherein the one or more processors are configured to perform a process of navigating the vehicle based on the mental state information and the data.

5. The vehicle user-assistance system according to claim 1, wherein the one or more processors are configured to perform the process of facilitating the change in the mental state by producing a scent, light, or a voice according to the mental state to the user.

6. The vehicle user-assistance system according to claim 5, wherein, the one or more processors are configured to, when the inferred mental state is a state of a high level of excitement, perform a process of producing a scent, light, or a voice that promotes relaxation and then producing a scent, light, or a voice that promotes awakening.

7. The vehicle user-assistance system according to claim 1, wherein the one or more processors are configured to perform, based on the mental state information, a process of generating basic data for calculating an insurance premium on driving insurance of the user.

8. The vehicle user-assistance system according to claim 1, wherein one or more processors are configured to perform, further based on information on a new mental state of the user who has undergone a change in the mental state, the process of generating basic data for calculating an insurance premium on driving insurance of the user.

9. A vehicle user-assistance device comprising one or more processors configured to perform a process of facilitating a change in a mental state of a user as a process of assisting the user having entered a vehicle based on mental state information on the mental state of the user, the mental state constituting a factor negatively affecting driving when the user drives the vehicle and being inferred from user voice acquired through a mobile terminal carried by the user before the user enters the vehicle.

10. The vehicle user-assistance system according to claim 1, wherein the one or more processors are configured to perform a process of relieving the mental state as the process of facilitating the change in the mental state when the mental state represented by a numerical value exceeds a threshold value.

* * * * *